May 4, 1926.

R. C. BENNER

STORAGE BATTERY

Filed Sept. 2, 1922

1,583,648

Inventor:
Raymond C. Benner,
By Byrnes, Townsend & Brickenstein,
Attorney

Patented May 4, 1926.

1,583,648

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

STORAGE BATTERY.

Application filed September 2, 1922. Serial No. 585,960.

*To all whom it may concern:*

Be it known that I, RAYMOND C. BENNER, a citizen of the United States, residing at Bayside, in the county of Queens and State of New York, have invented certain new and useful Improvements in Storage Batteries, of which the following is a specification.

This invention relates to storage batteries generally, but particularly to the types of storage batteries used with flashlights and radio apparatus. In these and other special types of storage batteries which are handled considerably and used about clothing and corrodible articles, it is highly desirable to prevent the escape of electrolyte, corrosive gases and vapor, and the primary object of this invention is therefore to provide a storage battery that shall retain the electrolyte and vapors, and absorb or neutralize the escaping gases.

Figure 1:
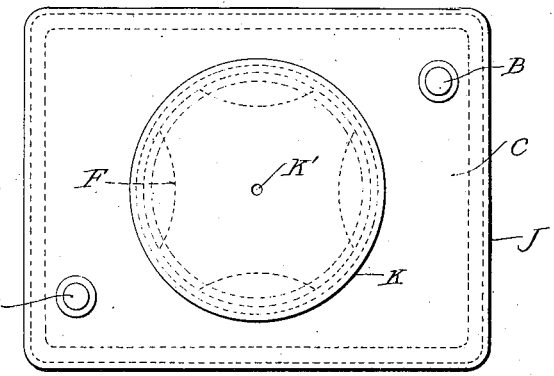
Figure 2:
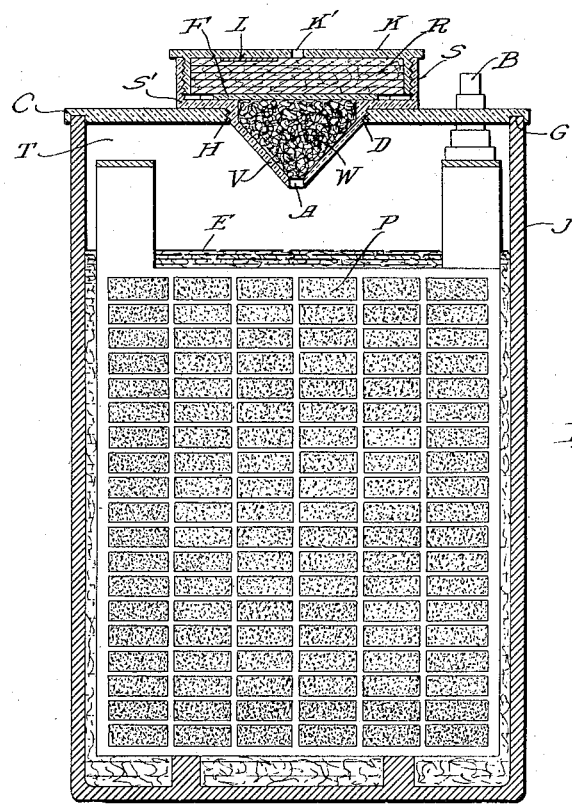
Figure 3:
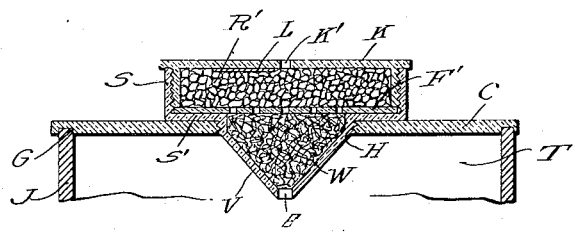

The above and other objects and the novel features of the invention will be apparent from the following description taken with the accompanying drawings, in which Figs. 1 and 2 are, respectively, a top plan view and a central vertical sectional view of a storage battery embodying this invention; and Fig. 3 is a sectional view illustrating another embodiment of my invention.

Referring to Figs. 1 and 2 of the drawings, the cell jar J may be of hard rubber or other suitable material adapted to contain the usual positive and negative electrodes or plates P and the acid electrolyte E. Suitable electrolyte absorbent material or separators or both may be disposed between the plates, and the latter may have the usual positive and negative binding posts B joined thereto. These posts may project through a transparent cover C, desirably of celluloid, which has a groove G in its lower face adjacent its margin to receive the upper edge of the jar J, to which the cover may be united by an acid-tight joint, as by placing battery sealing composition in said groove.

The means for arresting escape of electrolyte and vapor and reducing or absorbing corrosive gases is desirably placed at the upper end of the jar as on the cover C which has a threaded hole H adapted to receive an externally threaded portion D of a vent device made of celluloid or the like constructed to form a combined acid trap, vapor arrestor and absorbent chamber. One end V of the vent forms a vapor arrestor which projects into the space in the jar above the electrolyte and may be funnel-shape and provided with an aperture, as at A, to permit the escape of gas and the return of electrolyte carried out by the escaping gas or otherwise. The vapor arrestor V may contain oiled glass wool W or other suitable material which will intercept vapor in the escaping gas without interfering with the free passage of such gas, as explained in my Patent No. 1,506,216, dated August 26, 1924.

The upper or outer end of the cup or vent may be enlarged to provide an absorbent chamber S having a bottom portion S' that bears against the upper side of the cover C. A baffle plate F of celluloid or the like rests loosely on the inner side of the bottom S' and serves as a cover for the vapor arrester V to retard escape of oil and acid from the chamber V into the chamber containing the absorbent material R but permitting the escape of gas around its edge into the absorbent chamber. As shown in Fig. 2, the absorbent material R may consist of porous pads such as sheets of blotting paper or other suitable absorbent material which may be saturated with suitable chemical substance such as sodium carbonate and sodium hyposulfite solution. The sodium hyposulfite reduces any oxidizing gases given off, such as ozone, and the sodium carbonate neutralizes any acid which may pass through the vapor arrester. In the arrangement shown the upper pads are desirably saturated with sodium carbonate and the lower ones with sodium hyposulfite so that any sulfur dioxid liberated by the decomposition of the sodium hyposulfite will be taken up by the sodium carbonate. These chemically treated pads will effectively neutralize the corrosive gases from the sulfuric acid cell when on charge, discharge and on shelf.

Other kinds of absorbent material may be employed instead of the pads R. In the device shown in Fig. 3, for example, a quantity of activated carbon R' is carried in the cap K, the same being held in place by a perforated plate F' cemented to the cap. Such carbon has a very high adsorption capacity for gases and thus will also absorb or dispose of the corrosive gases and vapors given off in the cell.

An indicator L that changes color or other condition such as litmus paper may be placed upon the absorbent pads or activated carbon inside of the transparent cap K in position where it is visible to show when the gas absorption system is exhausted and needs renewal. The cap K may be of suitable transparent material such as celluloid and is adapted to screw onto the top end of the vent device to hold the absorbent material and plates in place, and is provided with a suitable gas vent K'. The condition of the electrolyte and elements of the battery and the condition of the gas absorption system may be readily determined through the transparent jar cover and the transparent cap of the gas absorption chamber.

The space T between the inside of the cover and the aperture A of the vapor arrestor V forms an acid trap to prevent the spilling of the acid when the battery is tilted or inverted. However, for practical purposes, it is most desirable that electrolyte absorbent material such as glass wool or sulfite pulp fibers be packed around all sides of the plates, whether it is used between the plates or not. The electrolyte absorbent carries practically all of the electrolyte and prevents the formation of spray in the space T during gassing. Unless such absorbent material is used considerable acid enters the vapor arresting and gas absorption system which then becomes exhausted very quickly. The acid absorbent material may also be inserted between thinner plates to take the place of separators, or may be used in conjunction with such separators.

While a particular embodiment of the invention is disclosed it will be understood that details thereof may be varied without departing from the spirit of the invention or sacrificing the advantages thereof.

I claim:—

1. In a storage battery, the combination with electrodes and an electrolyte, of a container therefor, vapor arresting means carried by said container above said electrolyte, and absorbent means carried by said container above said vapor arresting means.

2. In a storage battery, the combination with electrodes and an electrolyte, of a container therefor, absorbent means carried by said container above said electrolyte, and indicating means associated with said absorbent means to indicate the condition thereof.

3. In a storage battery, the combination with electrodes and an electrolyte, of a container therefor, vapor arresting means above said electrolyte, chemically-treated absorbent means above said vapor arresting means, and indicating means associated with said absorbent means to indicate the condition thereof.

4. In a storage battery, in combination, a cover having an opening, a vent in said opening, and a porous pad in said vent carrying means for treating and neutralizing corrosive gas.

5. In a storage battery, in combination, a cover having an opening, and a vent device in said opening having a chamber inside said battery containing means for arresting vapors and another chamber containing means for absorbing corrosive gases.

6. In a storage battery, the combination with electrodes and an electrolyte, of a container therefor having a cover comprising transparent material, and chemically-treated absorbent means in said container above said electrolyte and visible through said transparent material.

7. In a storage battery, the combination with electrodes and an electrolyte, of a container therefor having a cover comprising a transparent portion, absorbent means in said container above said electrolyte, and means visible through said transparent portion adapted to indicate the condition of said absorbent means.

8. In a storage battery, in combination, a cover having an opening, a vent in said opening, and sodium compound in said vent adapted to treat escaping corrosive gases.

9. In a storage battery, in combination, a cover having an opening, a vent device in said opening having a transparent cap, means in said device for treating and neutralizing escaping corrosive gases, and means visible through said cap for indicating the condition of such treating and neutralizing means.

10. In a storage battery, in combination, a cover having an opening therein, a vent in said opening comprising a combined vapor arrester and corrosive gas neutralizing means, a transparent cap for said vent, and means visible through said cap for indicating the condition of said gas neutralizing means.

11. In a storage battery, in combination, a cover having an opening therein, and a vent device in said opening comprising a combined vapor arrester and corrosive gas neutralizing means, such vapor arrester projecting into the battery and cooperating with said cover to provide an acid trap.

In testimony whereof, I affix my signature.

RAYMOND C. BENNER.